(12) United States Patent
Shimazaki

(10) Patent No.: US 11,522,238 B2
(45) Date of Patent: Dec. 6, 2022

(54) BATTERY PACK

(71) Applicant: TOYOTA JIDOSHA KABUSHIKI KAISHA, Toyota (JP)

(72) Inventor: Rika Shimazaki, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 16/671,309

(22) Filed: Nov. 1, 2019

(65) Prior Publication Data

US 2020/0153058 A1  May 14, 2020

(30) Foreign Application Priority Data

Nov. 12, 2018 (JP) .............................. JP2018-212344

(51) Int. Cl.
| | |
|---|---|
| *H01M 10/6555* | (2014.01) |
| *H01M 10/613* | (2014.01) |
| *H01M 10/0585* | (2010.01) |
| *H01M 50/20* | (2021.01) |

(52) U.S. Cl.
CPC ... *H01M 10/6555* (2015.04); *H01M 10/0585* (2013.01); *H01M 10/613* (2015.04); *H01M 50/20* (2021.01)

(58) Field of Classification Search
CPC ............. H01M 50/20; H01M 10/0585; H01M 10/6556; H01M 10/052; H01M 10/0562; H01M 10/613; H01M 10/617; H01M 10/6557; H01M 10/6568; H01M 10/0565; H01M 50/557; H01M 50/543; H01M 50/124; H01M 10/647; H01M 10/6555; H01M 10/0481; Y02P 70/50; Y02E 60/10

See application file for complete search history.

(56) References Cited

U.S. PATENT DOCUMENTS

| | | |
|---|---|---|
| 5,756,227 A | 5/1998 | Suzuki et al. |
| 6,761,992 B1 | 7/2004 | Marukawa et al. |
| 9,705,156 B2 | 7/2017 | Dorsch |

(Continued)

FOREIGN PATENT DOCUMENTS

| | | | | |
|---|---|---|---|---|
| CN | 102315501 A | * | 1/2012 | .......... H01M 10/652 |
| CN | 202839892 U | * | 3/2013 | ........... H01G 9/0003 |

(Continued)

*Primary Examiner* — Kaity V Chandler
(74) *Attorney, Agent, or Firm* — Dickinson Wright, PLLC

(57) ABSTRACT

A battery pack includes a plurality of cells, a plurality of heat releasing members, and a restraining unit. Each of the plurality of cells includes a pair of planar portions opposed to each other, and the plurality of cells are arranged such that planar portions of each adjacent pair of the cells are in a face-to-face relationship. The plurality of heat releasing members are disposed intermittently between adjacent pairs of cells along a direction in which the plurality of cells are arranged, and each of the plurality of heat releasing members juts out from the planar portions of the adjacent cells in regions where the plurality of heat releasing members are disposed. The restraining unit includes a pair of restraining members and a support member supporting the pair of restraining members, the pair of restraining members restraining opposite ends of the plurality of cells arranged with the plurality of heat releasing members interposed.

7 Claims, 5 Drawing Sheets

(56) References Cited

U.S. PATENT DOCUMENTS

| | | |
|---|---|---|
| 2006/0169507 A1 | 8/2006 | Inoue et al. |
| 2010/0190049 A1 | 7/2010 | Kawase et al. |
| 2012/0009455 A1 | 1/2012 | Yoon |
| 2012/0234613 A1 | 9/2012 | Miyatake |
| 2012/0301772 A1 | 11/2012 | Hirsch |
| 2013/0011713 A1 | 1/2013 | Harada et al. |
| 2013/0130086 A1 | 5/2013 | Schaefer |
| 2013/0202924 A1 | 8/2013 | Kwak et al. |
| 2015/0064521 A1 | 3/2015 | Watanabe et al. |
| 2016/0190526 A1 | 6/2016 | Yamada et al. |
| 2016/0336549 A1 | 11/2016 | Brisbane et al. |
| 2017/0098814 A1 | 4/2017 | Golubkov |
| 2017/0104252 A1 | 4/2017 | Wunsche et al. |
| 2017/0110773 A1 | 4/2017 | Pucher |

FOREIGN PATENT DOCUMENTS

| | | | | |
|---|---|---|---|---|
| CN | 205609622 U | * | 9/2016 | ............. Y02E 60/10 |
| CN | 104321902 B | | 6/2017 | |
| JP | 2003-249205 A | | 9/2003 | |
| JP | 2009-026703 A | | 2/2009 | |
| JP | 2009026703 A | * | 2/2009 | ............ H01M 50/20 |
| JP | 2011165361 A | | 8/2011 | |
| JP | 2012022830 A | * | 2/2012 | ............ Y02E 60/10 |
| JP | 2013-045578 A | | 3/2013 | |
| JP | 2013222563 A | | 10/2013 | |
| JP | 2013225432 A | * | 10/2013 | ............. Y02E 60/10 |
| JP | 2015053261 A | | 3/2015 | |
| JP | 2015076187 A | | 4/2015 | |
| JP | 2017041311 A | | 2/2017 | |
| JP | 2017123313 A | | 7/2017 | |
| WO | 2011061931 A1 | | 5/2011 | |

* cited by examiner

BATTERY PACK

CROSS REFERENCE TO RELATED APPLICATION

The present application claims priority from Japanese Patent Application No. 2018-212344 filed on Nov. 12, 2018, which is incorporated by reference herein in its entirety.

BACKGROUND

The present disclosure relates to battery packs.

JP 2013-045578 A discloses a battery pack equipped with cooling plates between adjacent battery cells and including a connecting pipe that supplies each of the cooling plates with a refrigerant. It is also disclosed that the connecting pipe is a flexible pipe.

JP 2009-026703 A discloses a battery pack including cells stacked in a stacking direction, wherein an end plate arranged at a stacking end is configured to be capable of changing the thickness with respect to the stacking direction.

SUMMARY

Generally, battery packs are easy to accumulate heat in a certain portion along a stacking direction. Consequently, a temperature variation may occur among the stacked battery cells.

A battery pack disclosed herein includes a plurality of cells, a plurality of heat releasing members, and a restraining unit. Each of the plurality of cells includes a pair of planar portions opposed to each other, and the plurality of cells are arranged such that planar portions of each adjacent pair of the cells are in a face-to-face relationship. The plurality of heat releasing members are disposed intermittently between adjacent pairs of cells along a direction in which the plurality of cells are arranged, and each of the plurality of heat releasing members juts out from the planar portions of the adjacent cells in regions where the plurality of heat releasing members are disposed. The restraining unit includes a pair of restraining members and a support member supporting the pair of restraining members, the pair of restraining members restraining opposite ends of the plurality of cells arranged with the plurality of heat releasing members interposed. Such an embodiment of the battery pack makes it possible to reduce temperature variations between the cells by means of the heat releasing members disposed intermittently along the direction in which the plurality of cells are arranged.

Herein, the plurality of heat releasing members may be disposed such that intervals between the heat releasing members are narrower in an intermediate portion of the arranged plurality of cells than at both ends of the arranged plurality of cells, along the direction in which the plurality of cells are arranged. Each of the plurality of heat releasing members may have a greater heat capacity in an intermediate portion of the arranged plurality of cells than at both ends of the arranged plurality of cells, along the direction in which the plurality of cells are arranged.

Each of the heat releasing members may include a pair of plates and an elastic body disposed between the pair of plates, the pair of plates respectively placed against respective planar portions of the cells adjacent thereto in a region where the each of the heat releasing members is disposed. In this case, it is also possible that one of the pair of plates may be disposed immovably relative to the restraining member, and the other one of the pair of plates may be disposed movably relative to the restraining member.

Each of the heat releasing members may include a recess into which the planar portion of one of the cells fits, the recess being formed in a surface thereof on which the planar portion of the one of the cells abuts.

Each of the cells may be a laminate-type cell including an electrode assembly and a laminate film covering the electrode assembly. Each of the cells may be an all-solid-state cell, for example.

DETAILED DESCRIPTION

The following describes an embodiment of a battery pack disclosed herein. It should be noted, however, that the embodiments described herein are, of course, not intended to limit the present invention. The present invention is not limited to the embodiments described herein unless specifically stated otherwise.

Figure 1:
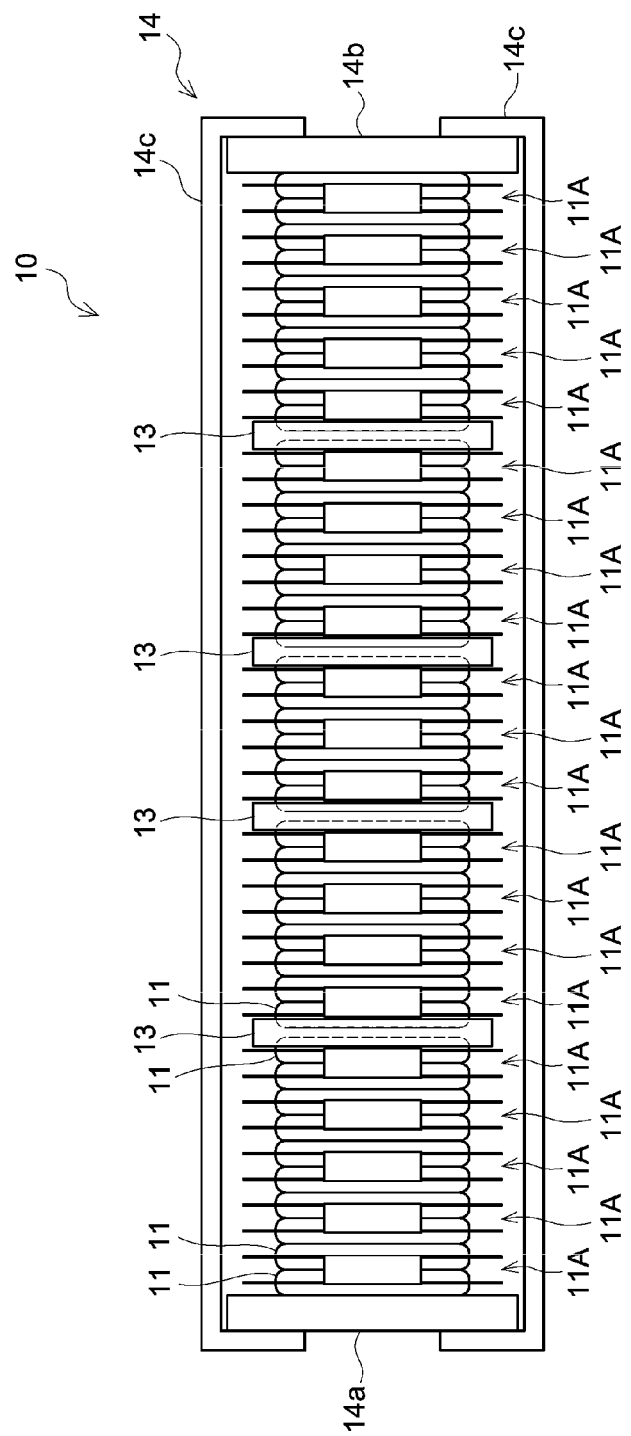
FIG. 1 is a side view schematically illustrating a battery pack 10 disclosed herein.
Figure 2:
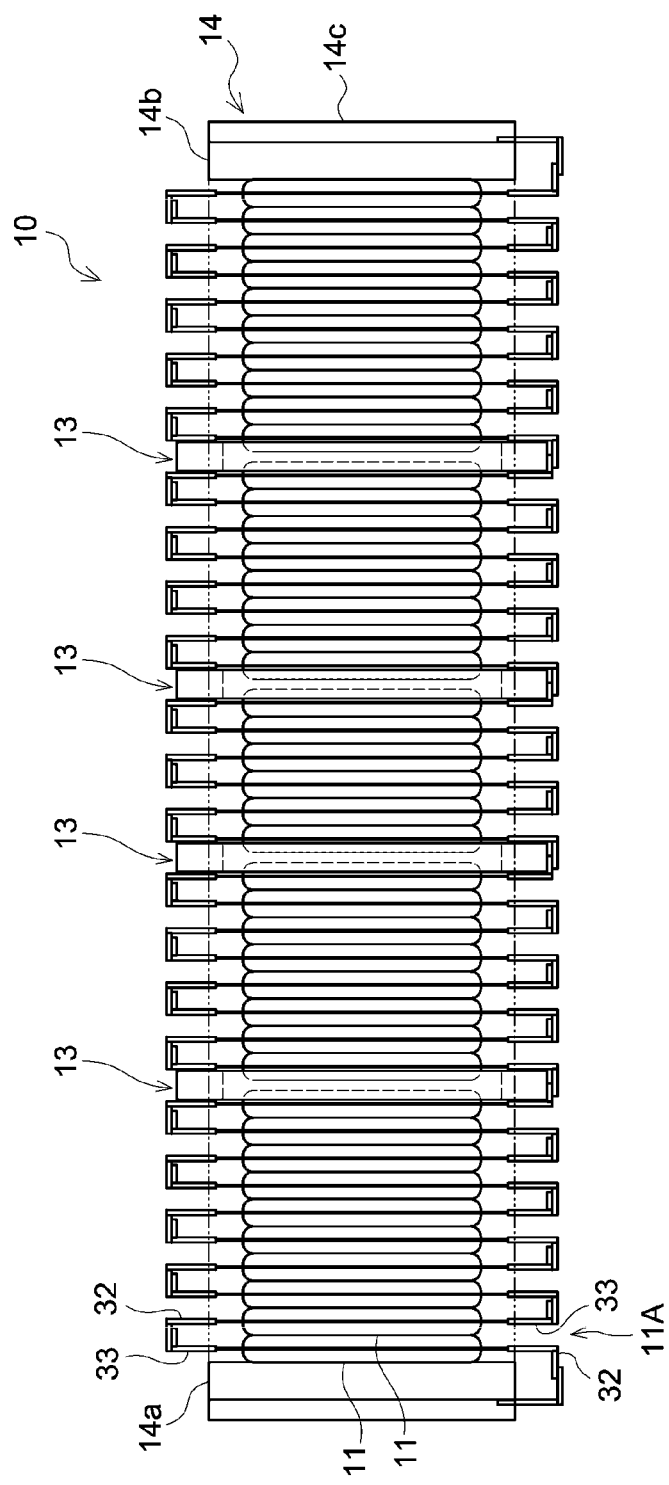
FIG. 2 is a plan view schematically illustrating the battery pack 10.

FIG. 1 is a side view schematically illustrating a battery pack 10 disclosed herein. FIG. 2 is a plan view schematically illustrating the battery pack 10. As illustrated in FIGS. 1 and 2, the battery pack 10 disclosed herein includes a plurality of cells 11, a plurality of heat releasing members 13, and a restraining unit 14. In FIG. 2, some part of the restraining unit 14 is indicated by dash-dot-dot lines.

Cell 11

Each of the plurality of cells 11 includes a pair of planar portions opposed to each other, and adjacent ones of the cells 11 are arranged so that the planar portions of the adjacent ones of the cells 11 face each other. Each of the cells 11 is a unit cell that constitutes a battery pack. In the present description, the term "battery" is intended to mean any electricity storage device in general that is capable of providing electric energy therefrom, which is intended to include primary batteries and secondary batteries. The term "secondary battery" refers to a repeatedly chargeable electricity storage device in general, and it is intended to encompass what is called storage batteries (chemical cells), such as lithium-ion secondary batteries, nickel-metal hydride batteries, and nickel-cadmium batteries, as well as capacitors (i.e., physical cells) such as electric double-layer capacitors.

Figure 3:
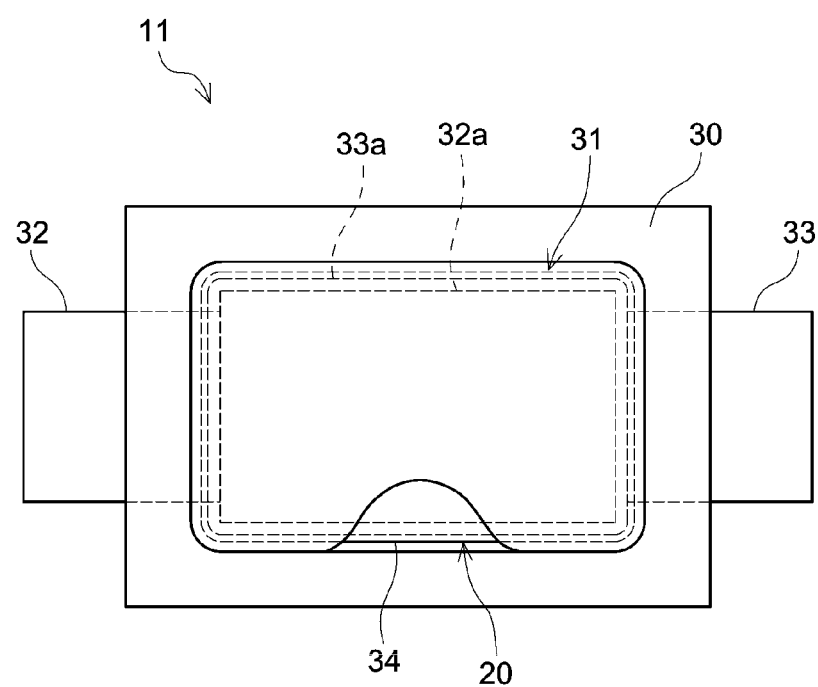
FIG. 3 is a plan view of a cell 11.

FIG. 3 is a plan view of the cell 11. In this embodiment, the cell 11 is a laminate-type cell in which an electrode assembly 20 is covered with a laminate film. FIG. 3 depicts an illustration in which a part of the laminate film is cut out and the electrode assembly 20 is partially exposed. The cell 11 is an all-solid-state battery. The all-solid-state battery includes an electrolyte that is composed of a solid electrolyte. In order to allow the charge carriers to be transferred smoothly through the solid electrolyte and keep the resistance low, the all-solid-state battery requires that an appropriate pressure be applied to the electrode assembly 20 so that sufficient contact is ensured between the electrode active materials and the solid electrolyte. On the other hand, the expansion during charge and the contraction during discharge are considerable. In addition, the cell 11 generates heat during charge and discharge. It is preferable that the battery pack 10 be able to keep the temperature variations small between the plurality of cells 11 that are incorporated into the battery pack 10.

In this embodiment, the cell 11 is a laminate-type cell in which the entire circumference of the electrode assembly 20 is covered with a laminate film 30. As illustrated in FIG. 3, the cell 11 includes planar portions 31, a positive electrode terminal 32, and a negative electrode terminal 33.

The planar portions 31 are parts of the cell 11 in which the electrode assembly 20 is enclosed. In this embodiment, each of the cells 11 is composed of an all-solid-state battery. The electrode assembly 20 has a stacked structure in which, for example, a positive electrode current collector, a positive electrode layer 32a, a solid electrolyte layer 34, a negative electrode layer 33a, and a negative electrode current collector are stacked one on another, although some are not shown in the drawings In this embodiment, the outermost circumference of the electrode assembly 20 is covered by the solid electrolyte layer 34.

In this embodiment, as illustrated in FIG. 3, each of the planar portions 31 of the cell 11 is in a substantially rectangular shape, and each of the planar portions 31 is a part that covers a substantially rectangular flat electrode assembly. The laminate film seals the cell 11 so as to cover the circumference of the planar portions 31.

The electrode assembly 20, which is to be enclosed in the planar portions 31, includes the positive electrode current collector (not shown) stacked in the electrode assembly 20, the positive electrode layer 32a staked on the positive electrode current collector, the solid electrolyte layer 34 stacked so as to cover the positive electrode layer 32a, the negative electrode layer 33a stacked on the solid electrolyte layer 34, and the negative electrode current collector (not shown). Each of the positive electrode current collector, the positive electrode layer 32a, the solid electrolyte layer 34, the negative electrode layer 33a, and the negative electrode current collector (not shown) is in a substantially rectangular shape. For simplicity in illustration, FIG. 3 does not show the positive electrode current collector, the negative electrode current collector, and the solid electrolyte layer.

The positive electrode layer 32a is a solid electrolyte layer containing a positive electrode active material. The negative electrode layer 33a is a solid electrolyte layer containing a negative electrode active material. The solid electrolyte layer 34 is a solid electrolyte layer containing no active material. Both the negative electrode layer 33a and the solid electrolyte layer 34 are slightly larger in size than the positive electrode layer 32a so that they cover the positive electrode layer 32a in a stacking direction.

The positive electrode current collector is provided with the positive electrode terminal 32. The negative electrode current collector is provided with the negative electrode terminal 33. The positive electrode terminal 32 protrudes from one end of the laminate film, in which the electrode assembly is enclosed. The negative electrode terminal 33 protrudes from the other end of the laminate film, in which the electrode assembly is enclosed. In the embodiment, the positive electrode terminal 32 is provided on one end of the planar portions 31, in which the electrode assembly is enclosed, and the negative electrode terminal 33 is provided on the other end of the planar portions 31.

Thus, in this embodiment, each of the planar portions 31 has a pair of opposing ends, and the positive electrode terminal 32 is disposed at one of the opposing ends while the negative electrode terminal 33 is disposed at the other end. The plurality of cells 11 are oriented alternately such that, in each adjacent pair of the cells 11, the positive electrode terminal 32 of one of the cells 11 and the negative electrode terminal 33 of the other one are disposed on the same side.

When each adjacent pair of the cells 11 are connected in series, the positive electrode terminal 32 of one of the cells 11 and the negative electrode terminal 33 of the other one are disposed on the same side in each adjacent pair of the cells 11. In other words, the adjacent cells 11 are oriented alternately. Although not shown in the drawings, when each adjacent pair of the cells 11 are connected in parallel, the plurality of cells 11 are oriented uniformly such that, in each adjacent pair of the cells 11, the positive electrode terminals 32 of both cells 11 are disposed on one side and the negative electrode terminals 33 of both cells 11 are on the other side. In other words, the adjacent cells 11 are oriented in the same direction.

Various proposals have been made for the laminate film for the laminate-type cell, the positive electrode active material, the negative electrode active material, and the solid electrolyte for constructing an all-solid-state battery, and there is no particular restriction on such components. Note that in the present embodiment, each of the planar portions 31 of the cell 11 is in a substantially rectangular shape. However, unless specifically stated otherwise, the planar portions 31 of the cell 11 need not be in a substantially rectangular shape. In another embodiment, the positive electrode terminal 32 and the negative electrode terminal 33 may protrude in the same direction from the inside of the laminate film enclosing the electrode assembly 20. Thus, the position at which the positive electrode terminal 32 or the negative electrode terminal 33 protrudes from the inside of the laminate film enclosing the electrode assembly 20 is not limited to the above-described embodiment, unless specifically stated otherwise.

Heat Releasing Member 13

The heat releasing members 13 are disposed intermittently between adjacent pairs of the cells 11, along the direction in which the plurality of cells 11 are arranged. For example, the heat releasing members 13 may be disposed intermittently between sets of cell pairs 11A, wherein each set of cell pairs 11A includes a plurality of adjacent pairs of cells 11, along a direction in which the plurality of cells 11 are arranged. Each of the heat releasing members 13 juts out from the planar portions of the adjacent cells 11 in the regions where the heat releasing members 13 are disposed.

Figure 4:
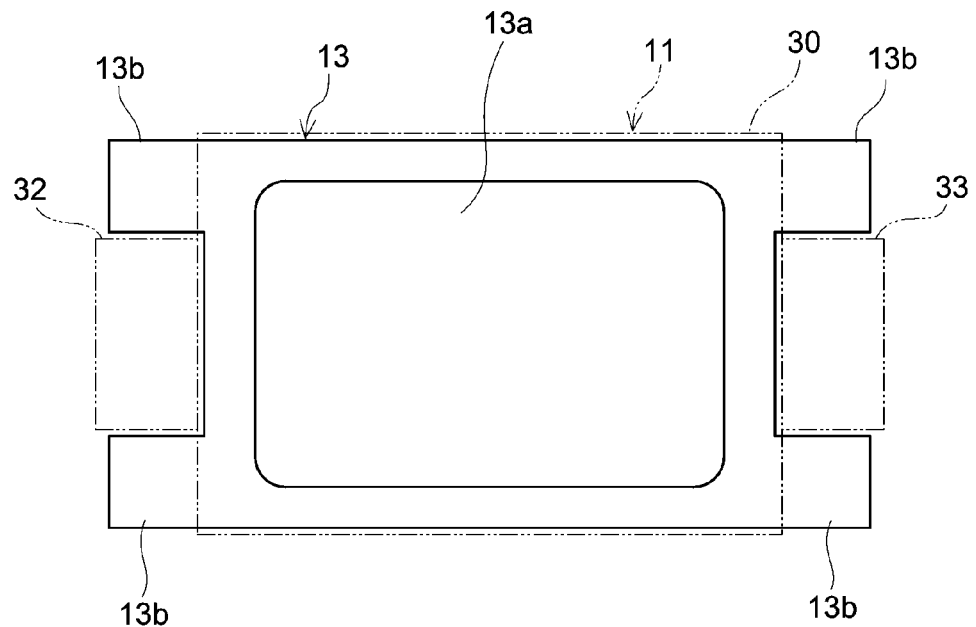
FIG. 4 is a front view of a heat releasing member 13.
Figure 5:
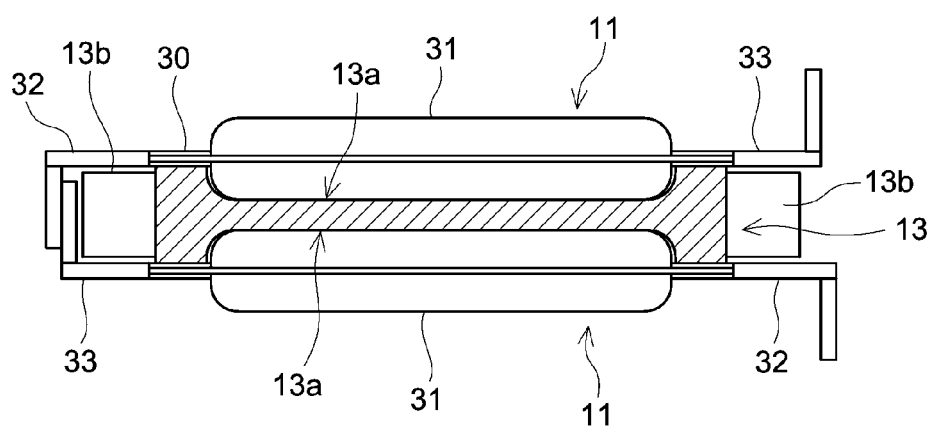
FIG. 5 is a plan view illustrating adjacent cells 11 sandwiching the heat releasing member 13 according to one embodiment of the disclosure.

FIG. 4 is a front view of a heat releasing member 13. For example, FIG. 4 depicts a cell 11 that is fitted to the heat releasing members 13 by dash-dot-dot lines. FIG. 5 is a plan view illustrating adjacent cells 11 sandwiching the heat releasing member 13 according to one embodiment of the disclosure. The heat releasing member 13 shown in FIG. 5 includes a recess 13a into which the planar portion 31 of one of the cells 11 is fitted. FIG. 5 also shows a cross section in which the heat releasing member 13 is partially cut out. The heat releasing member 13 may be made of, for example, aluminum or aluminum alloy, from the viewpoint of obtaining a required thermal conductivity and achieving weight reduction. The heat releasing member 13 is interposed between a pair of cells 11, and juts out from the planar portions 31 of the cells 11. The portions of the heat releasing member 13 that jut out from the cells 11 make contact with the air and exchange heat with the air. Each of the heat releasing members 13 is configured such that heat is exchanged with the cells 11 in the portions of the heat releasing members 13 that are in contact with the cells 11. Thereby, heat is taken away from the cells 11, and the heat is released through heat exchange with the air. Accordingly, by forming an air flow around the battery pack 10, the heat of the cells 11 is released efficiently through the heat releasing members 13.

As illustrated in FIGS. 4 and 5, each of the heat releasing members 13 has a plate-like shape and includes a recess 13a into which the planar portion 31 of one of the cells 11 fits. The recess 13a is formed in a surface of the heat releasing member 13 on which the planar portion 31 of the one of the cells 11 abuts. In this embodiment, recesses 13a are formed on both sides of the heat releasing member 13. Because the recesses 13a are provided on both sides of the heat releasing member 13, the increase in dimension due to the presence of the heat releasing members 13 is kept small even in cases where the heat releasing members 13 are interposed between adjacent cells 11.

As illustrated in FIG. 5, the heat releasing member 13 may jut out from the cells 11 at a position in which the heat releasing member 13 does not interfere with the positive electrode terminals 32 and the negative electrode terminals 33 of the cells 11 The portions 13b of the heat releasing member 13 that jut out from the cells 11 easily make contact with the air, contributing to heat release easily. Here, the depth of the recess 13a in the heat releasing member 13 may be less than the rising height of the planar portions 31 of the cells 11. The width of the recess 13a may be wider than the width of the planar portions 31. The width of the heat releasing member 13 between the positive electrode terminal 32 and the negative electrode terminal 33 of the cell 11 may be less than the width of the laminate film 30. In addition, the thickness of the heat releasing member 13 in the recess 13a may be equal to or greater than 0.5 mm, for example. Thus, the recess 13a of the heat releasing member 13 may have such dimensions as to be shallower than the rising height of the planar portions 31 of the cells 11 and to fit one of the planar portions 31 reliably therein. Moreover, the heat releasing member 13 may be in a shape such that it makes contact with the laminate film 30 but it does not make contact with the positive electrode terminals 32 or the negative electrode terminals 33. In this embodiment, as illustrated in FIGS. 4 and 5, the dimension of the heat releasing member 13 between the positive electrode terminals 32 and the negative electrode terminals 33 of the adjacent pair of the cells 11 is set to be such that the width of the heat releasing member 13 is inside the laminate film 30 at the location where the heat releasing member 13 makes contact with the laminate film 30. In addition, the portions 13b jutting out from the cells 11 protrude from the laminate film 30 at the positions at which the portions 13b do not come into contact with the positive electrode terminals 32 or the negative electrode terminals 33.

Because the heat releasing members 13 include such large portions that jut out from the cells 11, heat exchange with the air takes place efficiently, so that the heat can be released from the cells 11 efficiently. On the other hand, increasing the number of the heat releasing members 13 may be a cause of increasing the dimension of the battery pack 10 along the direction in which the plurality of cells 11 are arranged, and it may also be a cause of increasing the weight of the battery pack 10. From such a viewpoint, the heat releasing members 13 may be disposed particularly at the regions of the battery pack 10 in which heat is likely to accumulate. For example, the heat releasing members 13 may be disposed at regions where heat is likely to accumulate particularly significantly, taking the arrangement of other components of the battery pack 10 and the air flow around the battery pack 10 into consideration.

For example, in cases where the plurality of cells 11 arranged side by side generate heat substantially uniformly, the heat releasing members 13 may be disposed intermittently between adjacent pairs of the cells 11 along the direction in which the plurality of cells 11 are arranged. Because the heat releasing members 13 are disposed intermittently between adjacent pairs of the cells 11 along the direction in which the plurality of cells 11 are arranged, the temperatures of the cells 11 are stabilized at the regions where the heat releasing members 13 are disposed. In other words, the plurality of cells 11 arranged side by side are allowed to release their heat intermittently. As a result, it is possible to reduce the temperature variations between the plurality of cells 11 arranged side by side.

Furthermore, heat is more likely to accumulate in an intermediate portion of the arranged plurality of cells 11 than at both ends of the arranged plurality of cells 11, along the direction in which the plurality of cells 11 are arranged. In view of that, the intervals between the heat releasing members 13 may be narrower in the intermediate portion of the arranged plurality of cells 11 than at both ends of the arranged plurality of cells 11, along the direction in which the plurality of cells 11 are arranged. Such an embodiment allows the heat to be released easily at the intermediate portion along the direction in which the plurality of cells 11 are arranged, and consequently, the temperature variations can be reduced between the plurality of cells 11 arranged side by side. In place of such an embodiment, or in combination with such an embodiment, each of the heat releasing members 13 may have a greater heat capacity in an intermediate portion of the arranged plurality of cells 11 than at both ends of the arranged plurality of cells 11, along the direction in which the plurality of cells 11 are arranged. Such an embodiment also allows the heat to be released easily at the intermediate portion along the direction in which the plurality of cells 11 are arranged, and consequently, the temperature variations can be reduced between the plurality of cells 11 arranged side by side.

For example, in the embodiment shown in FIG. 1, the number of cells 11 arranged from each of the opposite ends to the first one of the heat releasing members 13 is 10, along the direction in which the plurality of cells 11 are arranged. The number of cells 11 arranged from the first one of the heat releasing members 13 to the next one of the heat releasing members 13 is 8 at either side. The number of cells 11 arranged between the heat releasing members 13 in the intermediate portion is 6. Note that the number of the cells 11 and the number of the heat releasing members 13, for example, are not limited to those shown in FIG. 1, and they may be varied as appropriate.

The number of cells 11 that are arranged between a pair of heat releasing members 13 may be set to a number that can be divided by the number of cells 11 that are connected in parallel (also referred to as the "parallel-connection number"). This means that no heat releasing member 13 is interposed between each pair of cells 11 connected in parallel, and therefore, connections between the cells 11 may be made with a uniform structure. This makes connection of the cells 11 easier. For example, when two cells 11 are connected in parallel to form a cell group and a plurality of cell groups, each including the two parallel connected cells, are connected in series, the number of the cells 11 arranged between a pair of heat releasing members 13 may be set to a multiple of 2, such as 10, 8, and 6. In another example, when three cells 11 are connected in parallel to form a cell group and a plurality of cell groups, each including the three parallel connected cells, are connected in series, the number of the cells 11 arranged between a pair of heat releasing members 13 may be set to a multiple of 3, such as 12, 9, and 6.

Restraining Unit 14

The restraining unit 14 includes a pair of restraining members 14a and 14b, and a support member 14c that supports the restraining members 14a and 14b. In this embodiment, the pair of restraining members 14a and 14b are members that restrain opposite ends of the plurality of cells 11 that are arranged side by side with the heat releasing members 13 interposed. The restraining members 14a and 14b may also be referred to as end plates. The support member 14c in this embodiment is a metal band spanning between the pair of restraining members 14a and 14b. The support member 14c may also be referred to as a restraining band.

Next, a modified example of the heat releasing member 13 will be described.

Figure 6:
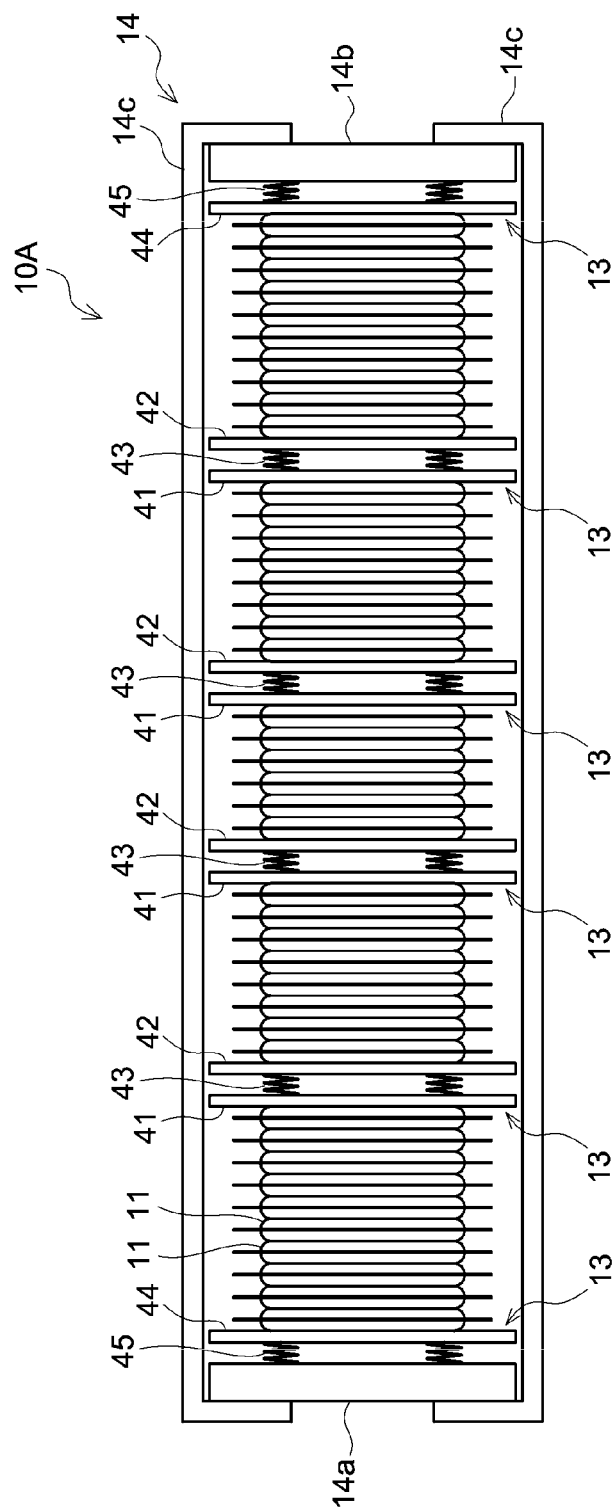
FIG. 6 is a side view schematically illustrating a battery pack 10A according to another embodiment of the disclosure.

FIG. 6 is a side view schematically illustrating a battery pack 10A according to another embodiment of the disclosure.

As illustrated in FIG. 6, each of the heat releasing members 13 may include a pair of plates 41 and 42 respectively placed against respective planar portions 31 of the cells 11 adjacent thereto, and elastic bodies 43 disposed between the pair of plates 41 and 42.

The locations at which the heat releasing members 13 are to be disposed in the battery pack 10 are as described above. For example, the heat releasing members 13 may be disposed intermittently between adjacent pairs of the cells 11, along the direction in which the plurality of cells 11 are arranged. Moreover, in this embodiment, as illustrated in FIG. 6, each of the restraining members 14a and 14b is also fitted to one of the plates 41 and 42 of the heat releasing members 13 via elastic bodies 43. Although each of the elastic bodies 43 may be a metal spring, it may be broken if the applied force thereto exceeds the elastic range. From this viewpoint, when the applied force is great, it is possible to employ a non-metallic spring, such as resin spring or rubber, that has required mechanical strength.

Thus, each of the heat releasing members 13 includes the pair of plates 41 and 42, respectively placed against the planar portions 31 of the cells 11 adjacent thereto, and the elastic bodies 43 disposed between the pair of plates 41 and 42. Such an embodiment allows the gap between the pair of plates 41 and 42 of each of the heat releasing members 13 to change according to the expansion and contraction of the cells 11. This makes it possible to apply an appropriate restraining force to the cells 11. As a result, even when each of the cells 11 is an all-solid-state cell in particular, it is possible to provide sufficient contact between the solid electrolyte and the active material, so that the resistance can be kept low.

One of the pair of plates 41 and 42 (for example, the plate 41) may be disposed immovably relative to the restraining members 14a and 14b of the restraining unit 14. When this is the case, the other one of the plates (for example, the plate 42) may be disposed relatively movably relative to the restraining members 14a and 14b. Such an embodiment prevents displacement of the plurality of cells 11 as a whole. The plate 41 that is disposed immovably may be fixed to, for example, a portion of the restraining unit 14 [for example, the support member 14c (restraining band)].

From the viewpoint that a required restraining force is to be applied to the cells 11, plates 44 each placed against one of the cells 11 may be provided between the restraining member 14a and one of the cells 11 adjacent thereto and between the restraining member 14b and one of the cells 11 adjacent thereto, and elastic bodies 45 may be provided between one of the plates 44 and the restraining member 14a and between the other plate 44 and the restraining member 14b, as illustrated in FIG. 6. In this case, the plates 44 can also serve the function as the heat releasing member 13.

Various embodiments of the battery pack have been described hereinabove according the present disclosure. Unless specifically stated otherwise, the embodiments of the battery pack described herein do not limit the scope of the present invention.

What is claimed is:

1. A battery pack comprising:
a plurality of cells comprising electrode terminals extending in first direction;
a plurality of heat releasing members;
a positive electrode and a negative electrode; and
a restraining unit, wherein:
each of the plurality of cells includes a pair of planar portions opposed to each other, and the plurality of cells are arranged such that planar portions of each adjacent pair of the cells are in a face-to-face relationship;
the plurality of heat releasing members are disposed intermittently between adjacent pairs of cells along a direction in which the plurality of cells are arranged, and each of the plurality of heat releasing members comprises one or more portions that jut out from the planar portions of the adjacent cells in the first direction in regions where the plurality of heat releasing members are disposed; and
the restraining unit includes a pair of restraining members and a support member supporting the pair of restraining members, the pair of restraining members restraining opposite ends of the plurality of cells arranged with the plurality of heat releasing members interposed;
wherein each of the cells is a laminate-type cell including an electrode assembly and a laminate film covering the electrode assembly;
wherein a width of each heat releasing member is inside the laminate film at a location where the heat releasing member makes contact with the laminate film; and
wherein the portion that juts out from the planar portion of the adjacent cells protrudes from the laminate film at a position that does not come into contact with the positive electrode or the negative electrode.

2. The battery pack according to claim 1, wherein the plurality of heat releasing members are disposed such that intervals between the heat releasing members are narrower in an intermediate portion of the arranged plurality of cells than at both ends of the arranged plurality of cells, along the direction in which the plurality of cells are arranged.

3. The battery pack according to claim 1, wherein each of the plurality of heat releasing members has a greater heat capacity in an intermediate portion of the arranged plurality of cells than at both ends of the arranged plurality of cells, along the direction in which the plurality of cells are arranged.

4. The battery pack according to claim 1, wherein each of the heat releasing members includes a pair of plates and an elastic body disposed between the pair of plates, the pair of plates respectively placed against respective planar portions of the cells adjacent thereto.

5. The battery pack according to claim 4, wherein one of the pair of the plates is disposed immovably relative to the restraining member, and the other one of the pair of the plates is disposed movably relative to the restraining member.

6. The battery pack according to claim 1, wherein each of the heat releasing members includes a recess into which the planar portion of one of the cells fits, the recess being formed in a surface thereof on which the planar portion of the one of the cells abuts.

7. The battery pack according to claim 1, wherein each of the cells is an all-solid-state cell.

* * * * *